(12) United States Patent
Tan et al.

(10) Patent No.: US 6,625,621 B2
(45) Date of Patent: Sep. 23, 2003

(54) SYSTEM AND METHODS FOR A FAST AND SCALABLE SYNCHRONIZATION SERVER

(75) Inventors: Chong-Kwan Tan, Cupertino, CA (US); Quowong Peter Liu, Santa Cruz, CA (US); Chris LaRue, Santa Cruz, CA (US)

(73) Assignee: Starfish Software, Inc., Scotts Valley, CA (US)

(*) Notice: Subject to any disclaimer, the term of this patent is extended or adjusted under 35 U.S.C. 154(b) by 274 days.

(21) Appl. No.: 09/737,607

(22) Filed: Dec. 14, 2000

(65) Prior Publication Data
US 2002/0078072 A1 Jun. 20, 2002

Related U.S. Application Data
(60) Provisional application No. 60/174,427, filed on Jan. 4, 2000.

(51) Int. Cl.[7] .............................................. G06F 17/30
(52) U.S. Cl. .......................................... 707/201; 707/10
(58) Field of Search ................................ 707/201, 202, 707/8, 10, 100, 102; 709/201, 213, 214, 248, 230, 204; 710/52, 107

(56) References Cited
U.S. PATENT DOCUMENTS

| | | |
|---|---|---|
| 4,769,796 A | 9/1988 | Levine |
| 4,866,611 A | 9/1989 | Cree et al. |
| 4,881,179 A | 11/1989 | Vincent |
| 4,977,520 A | 12/1990 | McGaughey, III et al. |
| 5,113,380 A | 5/1992 | Levine |
| 5,224,212 A | 6/1993 | Rosenthal et al. |
| 5,390,320 A | 2/1995 | Smithline |
| 5,392,390 A | 2/1995 | Crozier |
| 5,442,783 A | 8/1995 | Oswald et al. |
| 5,519,606 A | 5/1996 | Frid-Nielsen et al. |
| 5,666,530 A | 9/1997 | Clark et al. |
| 5,666,553 A | 9/1997 | Crozier |
| 5,684,990 A | 11/1997 | Boothby |
| 5,701,423 A | 12/1997 | Crozier |
| 5,706,509 A | 1/1998 | Man-Hak Tso |
| 5,710,922 A | 1/1998 | Alley et al. |
| 5,727,202 A | 3/1998 | Kucala |
| 5,729,735 A | 3/1998 | Meyering |
| 5,758,150 A | 5/1998 | Bell et al. |
| 5,758,355 A | 5/1998 | Buchanan |
| 5,761,667 A | 6/1998 | Koeppen |
| 5,778,346 A | 7/1998 | Frid-Nielsen et al. |
| 5,778,389 A | 7/1998 | Pruett et al. |
| 5,813,009 A | 9/1998 | Johnson et al. |
| 5,832,487 A | 11/1998 | Olds et al. |
| 5,913,214 A | 6/1999 | Madnick et al. |
| 5,926,816 A | 7/1999 | Bauer et al. |
| 5,974,238 A | 10/1999 | Chase, Jr. |
| 5,978,804 A | 11/1999 | Dietzman |
| 6,279,041 B1 * | 8/2001 | Baber et al. ................. 709/230 |
| 6,324,544 B1 * | 11/2001 | Alam et al. ................. 707/202 |
| 6,442,565 B1 * | 8/2002 | Tyra et al. ................... 707/102 |

* cited by examiner

Primary Examiner—Diane D. Mizrahi
(74) Attorney, Agent, or Firm—Ernest J. Beffel, Jr.; Haynes Beffel & Wolfeld LLP

(57) ABSTRACT

A sync server responds to messages from a client to synchronize data between a client dataset and a reference dataset. Various messages may be received from the client, including changes to the client dataset, requests for confirmation of received changes, or requests for changes to the reference dataset. When the server receives client changes, the server reads record ID's from the messages, writes the ID's into a change ID list, and places the changes into a queue for processing. When the server receives a request for confirmation of changes, the server uses the change ID list to confirm receipt of changes, including changes that have not yet been processed. If the server receives a message that requires that the reference dataset be up-to-date, such as a request for changes from the reference dataset, the sync server processes all of the changes in the queue before processing the new message.

10 Claims, 10 Drawing Sheets

| Table 1 -- Sending Changes From Client (i.e., Accessor) to Sync. Server ||||
|---|---|---|---|---|
| Time | Client Accessor || Synchronizer Core ||
| | Send | Receive | Send | Receive |
| 1 | UpdateRecord | | | |
| 2 | | | | UpdateRecord |
| 3 | DeleteRecord | | | |
| 4 | | | | DeleteRecord |
| 5 | LastRecordSent | | | |
| 6 | | | | LastRecordSent |
| 7 | | | AckLastRecSent | |
| 8 | | AckLastRecSent | | |

*FIG. 7A*

| Table 2 -- Sending Changes From Sync. Server to Client (i.e., Accessor) ||||| 
|---|---|---|---|---|
| Time | Client Accessor || Synchronizer Core ||
| | Send | Receive | Send | Receive |
| 23 | RetrieveRecords | | | |
| 24 | | | | RetrieveRecords |
| 25 | | | DeleteRecord | |
| 26 | | DeleteRecord | | |
| 27 | | | InsertRecord | |
| 28 | | InsertRecord | | |
| 29 | | | UpdateRecord | |
| 30 | | UpdateRecord | | |
| 31 | | | LastRecordSent | |
| 32 | | LastRecordSent | | |
| 33 | AckLastRecSent | | | |
| 34 | | | | AckLastRecSent |
| 35 | UpdateMap | | | |
| 36 | | | | UpdateMap |
| 37 | LastMapSent | | | |
| 38 | | | | LastMapSent |
| 39 | | | AckLastMapSent | |
| 40 | | AckLastMapSent | | |

*FIG. 7B* ions # US 6,625,621 B2

SYSTEM AND METHODS FOR A FAST AND SCALABLE SYNCHRONIZATION SERVER

RELATED APPLICATIONS

This application claims the benefit of U.S. Provisional Application No. 60/174,427 filed Jan. 4, 2000. The application is also related to the following commonly-owned U.S. patent applications, the disclosures of which are hereby incorporated by reference in their entirety, including any appendices or attachments thereof, for all purposes:

The serial # for SF/29.00 has probably come in by now.

Ser. No. 09/715,981, filed Nov. 17, 2000 and entitled SYSTEM AND METHODS FOR INHERITING INFORMATION INTO A DATASET;

Ser. No. 09/347,447, filed Jul. 3, 1999 and now U.S. Pat. No. 6,451,104 and entitled SYSTEM AND METHODS FOR SYNCHRONIZING DATASETS USING COOPERATION AMONG MULTIPLE SYNCHRONIZATION ENGINES;

Ser. No. 09/311,781, May 13, 1999 now U.S. Pat. No. 6,487,560 and entitled SYSTEM AND METHODS FOR SYNCHRONIZING DATASETS IN A NON-FIFO OR OTHERWISE DIFFICULT COMMUNICATION ENVIRONMENT;

Ser. No. 09/208,815, filed Dec. 8, 1998 now U.S. Pat. No. 6,477,545 and entitled SYSTEM AND METHODS FOR ROBUST SYNCHRONIZATION OF DATASETS;

Ser. No. 09/136,215, filed Aug. 18, 1998 now U.S. Pat. No. 6,295,541 and entitled SYSTEM AND METHODS FOR SYNCHRONIZING TWO OR MORE DATASETS;

Ser. No. 09/136,212, filed Aug. 18, 1998 and 627583 and entitled DATA PROCESSING ENVIRONMENT WITH METHODS PROVIDING CONTEMPORANEOUS SYNCHRONIZATION OF TWO OR MORE CLIENTS; and Ser. No. 08/923,612, filed Sep. 4, 1997 and entitled SYSTEM AND METHODS FOR SYNCHRONIZING INFORMATION AMONG DISPARATE DATASETS.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing. More particularly, the present invention relates to systems and methods for processing messages at a centralized processing node (e.g., server) according to some protocol. Even more particularly, the present invention relates to systems and methods for processing, at a server, messages for synchronizing independently modifiable user datasets, for example, for multiple users having user accounts at the server.

Increasingly, people are discovering the power of computer-based personal information managers (PIMs) for managing appointments and other personal information such as tasks ("to-do's") and addresses. Individuals employ PIMs, for example, on personal computers (PCs), handheld electronic devices, and World Wide Web servers accessed via browsers. Examples of PC-based PIMs include the Sidekick® software application, which is available from Starfish® Software, Inc. ("Starfish"), the present assignee. Examples of handheld-device-based PIMs include the StarTAC® clipOn Organizer device and the REX PRO™ organizer device—both of which include licensed technology from Starfish—as well as the popular Palm family of organizer devices. Examples of "Web-based" PIMs include an online PIM provided by Starfish at the World Wide Web site of truesync.com. Starfish®, Sidekick®, and TrueSync® are registered trademarks of Starfish. StarTAC® is a registered trademark of Motorola, Inc. of Schaumburg, Ill. Starfish is a wholly owned subsidiary of Motorola, Inc. REX™ and REX PRO™ are trademarks of Franklin Electronic Publishers of Burlington, N.J. Palm organizers are produced by Palm Computing, Inc., a subsidiary of 3Com Corp. of Santa Clara, Calif.

The use of PIMs is ever expanding, and it has become common for an individual person to keep multiple "copies" of the same information on separate devices. For example, a user may keep his or her appointments in a dataset (i.e., collection of data) on a desktop PC at work, in a dataset on a handheld device for use in the field, and in a dataset on a remotely-accessible server (e.g., a World Wide Web server) for use anywhere in the world. Such a user is free to change the information in any one of these datasets independently of the other datasets. By doing so, the user typically spoils the equivalence between the datasets. Therefore, the user would typically synchronize these personal datasets occasionally to bring them back into equivalence. To perform such synchronization, the user generally uses a synchronization system, for example, one that is described in commonly owned U.S. Pat. No. 5,519,606, which is hereby incorporated by reference.

In synchronizing data among datasets, speed is helpful. In particular, the amount of time that a user perceives is being spent or "tied up" on synchronization should be minimized. This need to minimize perceived synchronization time is especially important if the user is using a dataset that, during synchronization, is not capable of being used in an ordinary fashion (e.g., is not capable of being viewed or is not capable of being altered). Even more particularly, when the user synchronizes with a dataset that is on a remotely-accessible server, the synchronization speed should remain high even if the server is handling a large number of synchronizations per unit of time, for example, for a large number of datasets maintained by the server for a large number of users. In short, a synchronization scheme is needed that is both fast and scalable for handling large numbers of synchronizations per unit of time, especially when used for server-based synchronization. Furthermore, the integrity of synchronization should be maintained such that, for example, loss of synchronization messages in transit is properly handled. The present invention satisfies these and other needs.

SUMMARY OF THE INVENTION

One embodiment of the present invention comprises a method of synchronizing a client dataset of a synchronization client with a reference dataset of a synchronization server. In this method, a plurality of synchronization messages are received at the synchronization server from the synchronization client and the messages are queued according to a set of rules. Under these rules, if a message is a change message, a change identifier is read from the message, the change identifier is written into a change ID list, the message is placed in a queue for possible non-sequential processing, and another message is received. Also, under these rules, if a message is not a change message, the message is made available for immediate processing as an unqueued message, and the message is processed before another message is received. Also in the method, the plurality of synchronization messages is processed according to another set of rules. Under this other set of rules, if there is at least one queued message and there is no unqueued message, the next queued message is processed. If there is an unqueued message and there is no queued message, the unqueued message is processed. If there is at least one queued message and there is an unqueued message, and if processing the unqueued message requires that the reference dataset be up-to-date, then the next queued message is processed. If there is at least one queued message and there is an unqueued message, and if processing the unqueued message does not require that the reference dataset be up-to-date, then the unqueued message is processed. Also in the method, processing a change confirmation request message involves reading change identifiers from the change ID list and generating a change confirmation message.

In another embodiment of the invention, the above method further comprises the step of sending change messages to the synchronization client to indicate changes to be made to the client dataset. In another embodiment, processing a change message involves performing a conflict resolution and entering the change into a reference dataset if the change survives the conflict resolution. In another embodiment, messages are sent between the synchronization client and the synchronization server in the form of action objects. In another embodiment, a change message may comprise an update to an existing data record, an addition of a new data record or a deletion of an existing data record.

A different embodiment of the present invention involves a method for processing a plurality of synchronization messages received from a synchronization client. Here, the method comprises the steps of receiving the plurality of synchronization messages from the synchronization client and controlling the queuing of the messages according to a set of rules. Under these rules, if a message is queueable, the message is placed on a queue for possible nonsequential processing and another message is received. If a message is nonqueueable, the message is made available for immediate processing as an unqueued message and the message is processed before proceeding to receive another message. Also in the method, the plurality of synchronization messages is processed according to another set of rules. Under this set of rules, if there is at least one queued message and there is no unqueued message, the next queued message is processed. If there is an unqueued message and there is no queued message, the unqueued message is processed. If there is at least one queued message and there is an unqueued message, and if the unqueued message requires that the queue be cleared before processing the unqueued message, the next queued message is processed. If there is at least one queued message and there is an unqueued message, and if the unqueued message does not require that the queue be cleared before processing the unqueued message, the next unqueued message is processed.

In another embodiment of the invention, messages received from the synchronization client are initially placed in an input queue. In another embodiment, change messages are queueable. In another embodiment, all messages other than change messages are unqueueable. In another embodiment, the method described in the previous paragraph further comprises the steps of reading a change identifier from each change message, writing the change identifiers to a change ID list, and reading the change identifiers from the change ID list to prepare a change confirmation message. In another embodiment, processing a change message involves performing a conflict resolution and entering the change into a reference dataset if the change survives the conflict resolution.

Another embodiment of the present invention involves a synchronizer for synchronizing data records on a synchronization client with data records in a reference dataset wherein the synchronization client sends messages to the synchronizer during a synchronization process. The synchronizer comprises an input queue for initially queuing messages received from the synchronization client; a smart queue for queuing messages that are determined to be queueable; a smart queue loader for retrieving a message from the input queue and, if the message is queueable, placing the message on the smart queue and proceeding to retrieve another message from the input queue, or, if the message is not queueable, making the message available for immediate processing as an unqueued messaged and waiting until the message is processed before proceeding to retrieve another message from the input queue; and a synchronization engine for receiving messages one at a time from either the smart queue or directly from the smart queue loader, processing the synchronization messages, and making any required changes to the reference dataset, wherein the synchronization engine receives messages from the smart queue or the smart queue loader according to a set of rules. Under these rules, if there is at least one queued message and there is no unqueued message, the synchronization engine receives and processes the next queued message; if there is an unqueued message and there is no queued message, the synchronization engine receives and processes the unqueued message; if there is at least one queued message and there is an unqueued message, and if the unqueued message requires that the queue be cleared before processing the unqueued message, the synchronization engine receives and processes the next queued message; and if there is at least one queued message and there is an unqueued message, and if the unqueued message does not require that the queue be cleared before processing the unqueued message, the synchronization engine receives and processes the unqueued message.

In another embodiment, the synchronizer further comprises a listener for receiving messages from a communications channel between the synchronization client and the synchronizer, and for placing the messages into the input queue. In another embodiment, the synchronizer further comprises a smart queue unloader for retrieving messages from the smart queue and making the messages available for processing by the synchronization engine. In another embodiment, the synchronizer further comprises a change ID list, wherein, when the smart queue loader receives a change message from the synchronization client, the smart queue loader reads a change identifier from the change message and writes the change identifier into the change ID list, and wherein, when the synchronization engine receives a message requesting confirmation of received changes, the synchronization engine reads change identifiers from the change ID list and prepares a change confirmation message. In another embodiment, the synchronizer also synchronizes data records on other synchronization clients with data records in corresponding reference datasets. In another embodiment, the synchronizer works with multiple instances of each of the listener, the smart queue loader and the smart queue unloader to synchronize with multiple synchronization clients. In another embodiment, the synchronizer further comprises an output queue for queuing messages from the synchronizer server to the synchronizer client. In another embodiment, the synchronizer further comprises a writer for receiving messages from the output queue, and for placing the messages onto a communications channel between the synchronization client and the synchronizer. In another embodiment, the smart queue may be disabled, and, when the smart queue is disabled, all messages are passed directly from the smart queue loader to the synchronization engine.

BRIEF DESCRIPTION OF THE DRAWINGS

FIG. 7A is a table illustrating messages that may be sent between a sync client and a sync server when the sync client is sending changes to the sync server during a synchronization process.

FIG. 7B is a table illustrating messages that may be sent between a sync client and a sync server when the sync server is sending changes to the sync client during a synchronization process.

DETAILED DESCRIPTION OF A PREFERRED EMBODIMENT

The following description will focus on the currently-preferred embodiment of the present invention, which is operative in an environment typically including desktop computers, server computers, and portable computing devices, occasionally or permanently connected to one another. The currently-preferred embodiment of the present invention may be implemented in an application operating in an Internet-connected environment and running under an operating system, such as the Microsoft® Windows operating system, on an IBM-compatible Personal Computer (PC) configured as an Internet server. The present invention, however, is not limited to any particular environment, device, or application. Instead, those skilled in the art will find that the present invention may be advantageously applied to any environment or application in which an information processing server is used to process messages according to a protocol, especially if many messages may need to be handled in a finite period of time (e.g., more than one hundred, or more than one thousand, or more than ten thousand, messages per hour and/or users per hour). For example, the present invention may be advantageously applied to any environment or application in which synchronization is desired for multiple datasets, especially if many synchronizations may need to be handled in a finite period of time (e.g., more than one hundred, or more than one thousand, synchronizations per hour and/or users per hour). For example, the present invention may be advantageously embodied on a variety of different platforms, including Macintosh, Linux, EPOC, BeOS, Solaris, UNIX, NextStep, and the like. The description of the exemplary embodiments which follows is, therefore, for the purpose of illustration and not limitation.

I. Computer-Based Implementation

A. Basic System Hardware (e.g., for Server or Desktop Computers)

Figure 1:
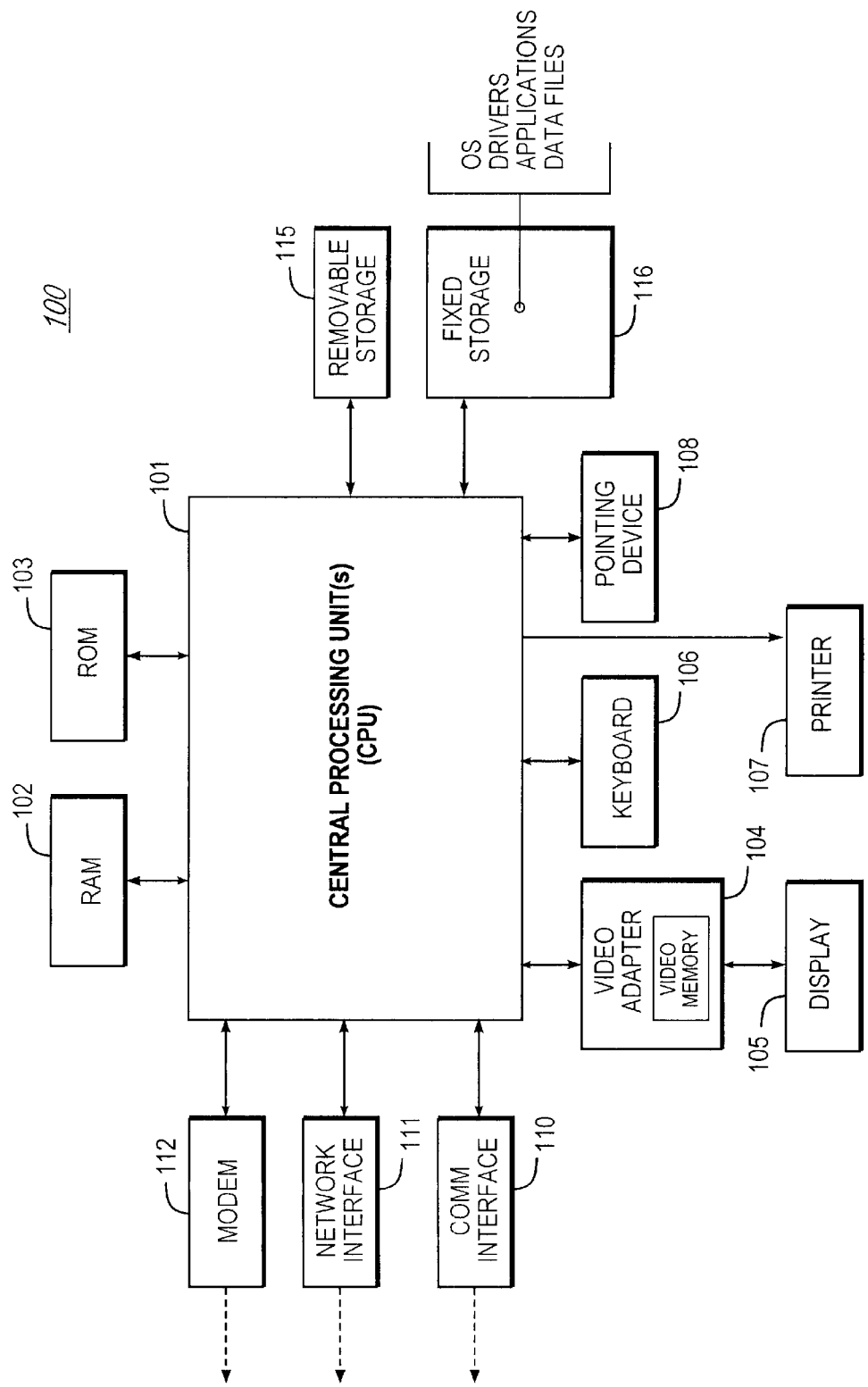
FIG. 1 is a block diagram of a computer system in which the present invention may be implemented.

The present invention may be implemented on a conventional or general-purpose computer system, such as an IBM-compatible personal computer (PC) or server computer. FIG. 1 is a general block diagram of an IBM-compatible system 100. As shown, system 100 comprises a central processor unit(s) (CPU) 101 coupled to a random-access memory (RAM) 102, a read-only memory (ROM) 103, a keyboard 106, a printer 107, a pointing device 108, a display or video adapter 104 connected to a display device 105 (e.g., cathode-ray tube, liquid-crystal display, and/or the like), a removable (mass) storage device 115 (e.g., floppy disk and/or the like), a fixed (mass) storage device 116 (e.g., hard disk and/or the like), a communication port(s) or interface(s) 110, a modem 112, and a network interface card (NIC) or controller 111 (e.g., Ethernet and/or the like). Although not shown separately, a real-time system clock is included with the system 100, in a conventional manner.

CPU 101 comprises a processor of the Intel Pentium® family of microprocessors. However, any other suitable microprocessor or microcomputer may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory (RAM) 102 serves as the working memory for the CPU 101. In a typical configuration, RAM of sixteen megabytes or more is employed. More or less memory may be used without departing from the scope of the present invention. The read-only memory (ROM) 103 contains the basic input/output system code (BIOS)—a set of low-level routines in the ROM 103 that application programs and the operating systems can use to interact with the hardware, including reading characters from the keyboard, outputting characters to printers, and so forth.

Mass storage devices 1115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, the fixed storage device 116 stores a body of programs and data for directing operation of the computer system, including an operating system, user application programs, driver and other support files, as well as other data files of all sorts. Typically, the fixed storage device 116 serves as the main hard disk for the system.

In basic operation, program logic (including that which implements methodology of the present invention described below) is loaded from the storage device or mass storage 115, 116 into the main random access memory (RAM) 102, for execution by the CPU 101. During operation of the program logic, the computer system 100 accepts, as necessary, user input from a keyboard 106 and pointing device 108, as well as possibly speech-based input from a voice recognition system (not shown). The keyboard 106 permits selection of application programs, entry of keyboard-based input or data, and selection and manipulation of individual data objects displayed on the display device 105. Likewise, the pointing device 108, such as a mouse, track ball, pen device, or the like, permits selection and manipulation of objects on the display device 105. In this manner, these input devices support manual user input for any process running on the computer system 100.

The computer system 100 displays text and/or graphic images and other data on the display device 105. The display device 105 is driven by the video adapter 104, which is interposed between the display 105 and the CPU 101. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the computer system 100, may be obtained from the printer 107, or other output device. The printer 107 may include, for instance, an HP LaserJet® printer (available from Hewlett-Packard of Palo Alto, Calif.), for creating hard copy images of output of the computer system 100.

The computer system 100 itself communicates with other devices (e.g., other computers) via the network interface card (NIC) 111 connected to a network (e.g., Ethernet network), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication ("comm") interface 110, which may include a RS-232 serial port, a Universal Serial Bus (USB) interface, or the like. Devices that will be commonly connected locally to the comm interface 110 include laptop computers, handheld organizers, digital cameras, and the like.

The above-described computer system 100 is presented for purposes of illustrating the basic hardware underlying desktop (client) and server computer components that may be employed in the system of the present invention. For purposes of discussion, the following description will present examples in which it will be assumed that there exists a client machine (e.g., desktop "PC") having application software locally that, in turn, is connected to a "server" or remote device having information of interest to the ultimate enduser. The present invention, however, is not limited to any particular environment or device configuration. In particular, a client/server distinction is neither necessary to the invention nor even necessarily desirable, but is used to provide a framework for discussion. Instead, the present invention may be implemented in any type of computer system or processing environment capable of supporting the methodologies of the present invention presented in detail below.

B. Basic System Software

Figure 2:
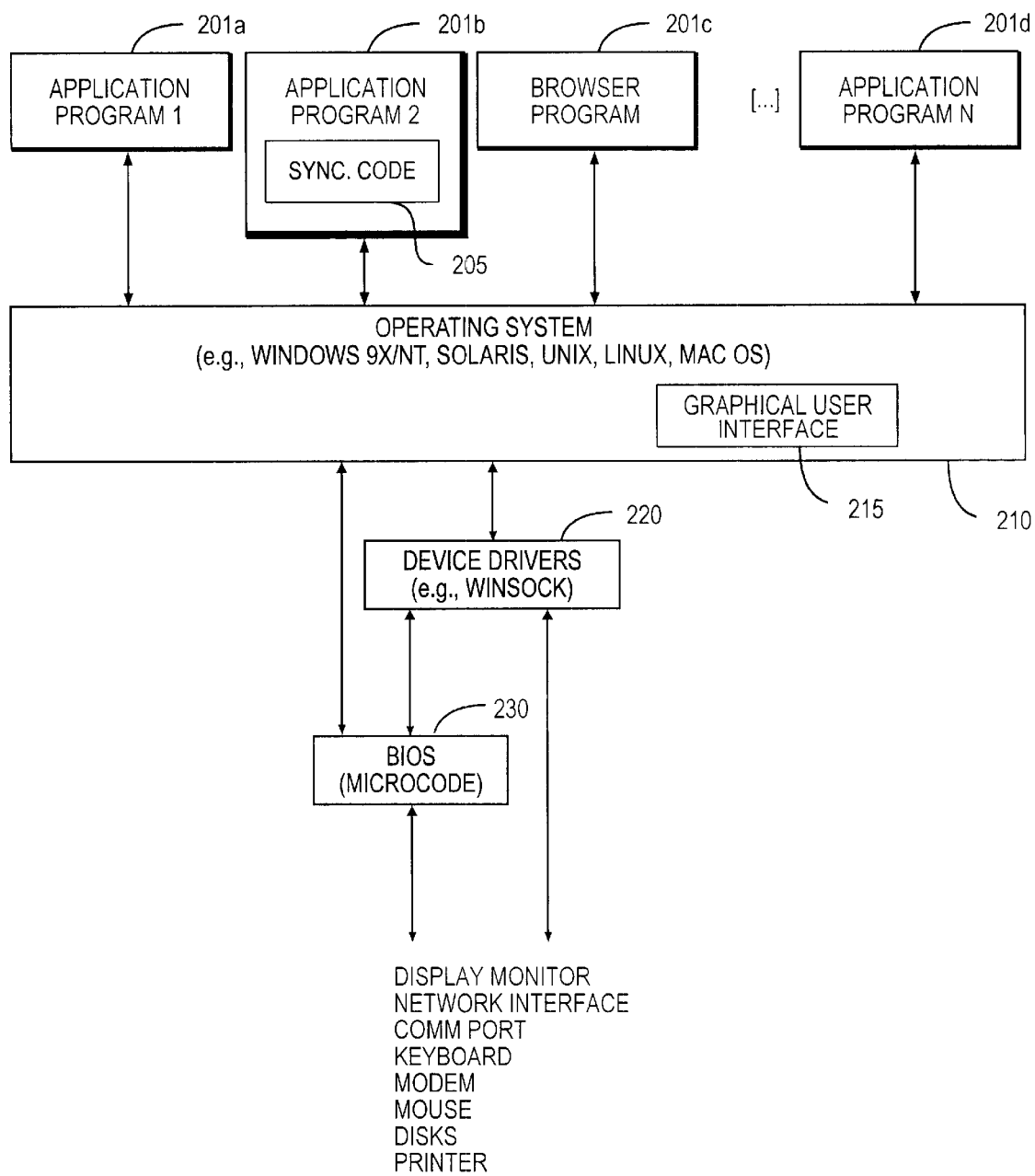
FIG. 2 is a block diagram of a computer software system for operation on the computer system of FIG. 1, in which the present invention may be implemented.

Illustrated in FIG. 2, a computer software system 200 is provided for directing the operation of the computer system 100. The software system 200, which is stored in the main memory (RAM) 102 and on the fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from the fixed storage 116 into the main memory 102) for execution by the computer system 100.

The software system 200 includes a graphical user interface (GUI) 215, for receiving user commands and data in a graphical (e.g., "point-and-click") fashion. These inputs, in turn, may be acted upon by the computer system 100 in accordance with instructions from the OS 210, and/or application programs 201. The GUI 215 also serves to display the results of operation from the OS 210 and application program(s) 201, whereupon the user may supply additional inputs or terminate the session. Typically, the OS 210 operates in conjunction with device drivers 220 (e.g., "Winsock" driver) and the system BIOS microcode 230 (i.e., ROM-based microcode), particularly when interfacing with peripheral devices. The OS 210 can be provided by a conventional operating system, such as Microsoft® Windows 9x, Microsoft® Windows NT, or Microsoft® Windows 2000, all of which are available from Microsoft Corporation of Redmond, Wash. Alternatively, OS 210 can also be an alternative operating system, such as IBM OS/2 (available from IBM Corporation of Armonk, N.Y.) or Macintosh OS (available from Apple Computer, Inc. of Cupertino, Calif.).

Of particular interest, at least one of the application programs 201 of the software system 200 is modified to include program code 205 for controlling a synchronization server of the present invention that provides synchronization services. Construction and operation of the synchronization system of the present invention, including supporting methodologies, will now be described in further detail.

II. A Modular View of the Synchronization System in its Environment

A. Overall System Configuration

Figure 3:
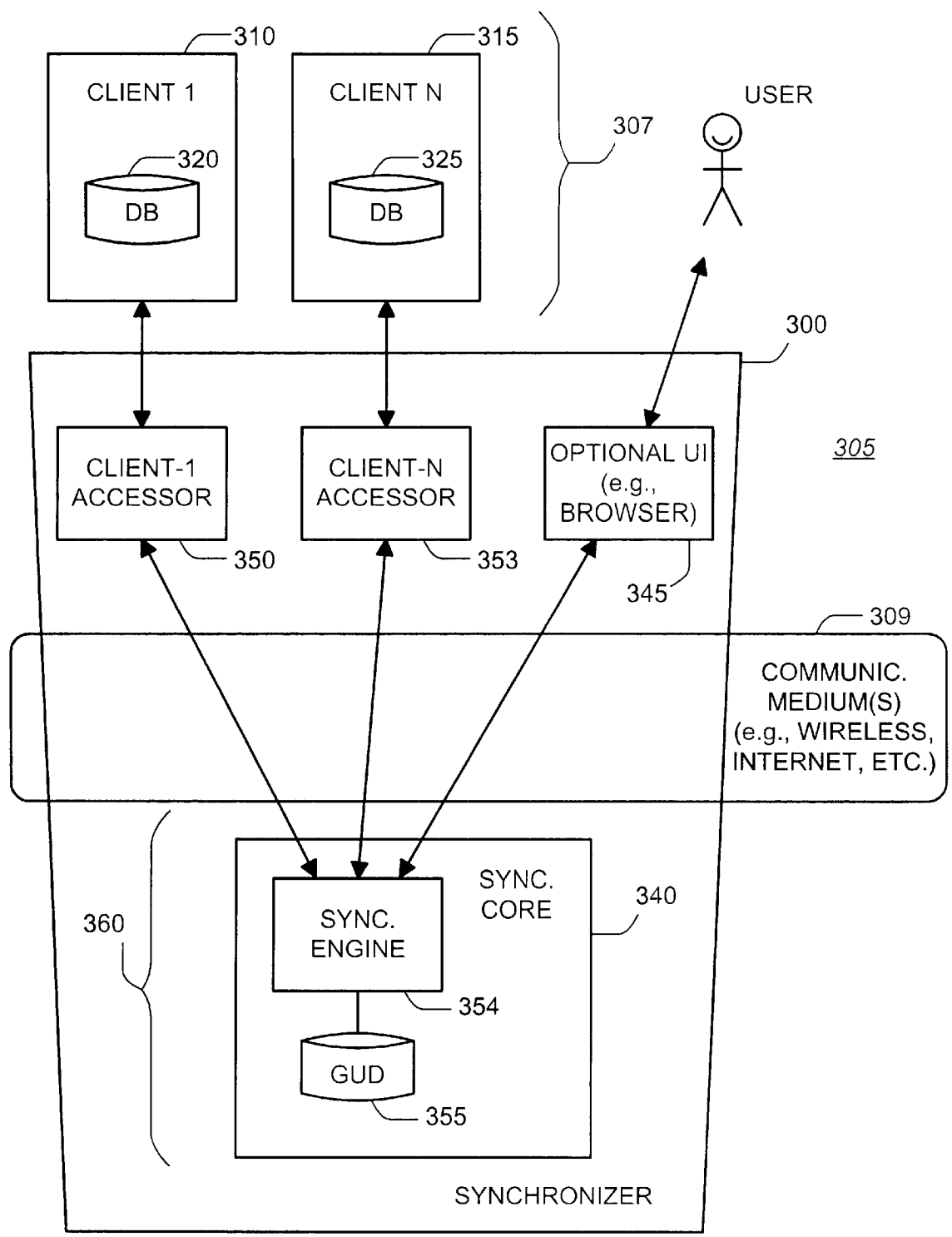
FIG. 3 is a block diagram of a synchronization environment in which the present invention may be implemented.

FIG. 3 is a block diagram that shows a synchronization system 300 ("synchronizer") in which the present invention may be embodied, in an example environment 305. The environment 305 includes communication mediums 309 (e.g., wireless network, Internet, and the like) and a number of synchronization clients 307. The synchronization clients 307 include user datasets and may participate in synchronization. Examples of possible synchronization clients 307 include the PalmPilot organizer, the REX™ organizer, and PIM software applications such as Microsoft Outlook or Starfish's Sidekick®. (Sidekick® is a registered trademark of Starfish.) As shown, the synchronization clients 307 include a first synchronization client 310 and an N-th synchronization client 315 that respectively include a dataset 320 and a dataset 325. The communication mediums 309 may include, for example, the Internet, and/or wire-line and wireless communication channels of all types, and the like.

The synchronization system 300 includes a synchronizer core 340, an optional User Interface 345 (UI), and client accessors including, for example, a first client's accessor 350 and an N-th client's accessor 353. The synchronizer core 340 includes a synchronization engine 354 and a reference dataset 355. Each client accessor includes sufficient knowledge (e.g., client-specific knowledge) to enable the accessor to access (for example, read and write) information in a client's dataset and to communicate such information to and from the synchronizer core 340, via the communication mediums 309. Each client accessor may, and preferably does, run on a same machine as the client, e.g., on a remote machine with respect to the synchronizer core 340. Information stored by a client accessor is preferably stored on the accessor's local machine for efficiency, or may be stored with the synchronizer core 340 and accessed by the accessor via its connection with the synchronizer core. The Synchronization engine 354 controls the reference dataset 355, which is also referred to as the synchronizer dataset or GUD ("Grand Unification Dataset"). The GUD is for storing a super-set of data from all datasets. The synchronizer core 340, in concert with the client accessors 350 and 353, manages the synchronization process. The optional UI 345 provides optional interactive input and output to a user during the synchronization process. The UI 345 optionally includes a browser or terminal or similar user interface technology and enables the user to view or modify the information in the GUD to thereby provide PIM functionality using the GUD.

In the present document, a portion 360 of the synchronization system 300—namely, the portion on the side of the communication mediums 309 that contains the synchronizer core 340—is referred to as the synchronization server 360, or "sync server" 360. The client accessors 350 and 353 are themselves considered to be clients of the sync server 360. In the remainder of this document, the terms "client" or "client dataset" alone may be used to refer to the synchronizer's client dataset accessor, and the terms "synchronizer" or "server" alone may be used to refer to the sync server 360 or synchronizer core 340 (e.g., core logic and/or reference dataset), for simplicity. Context should make clear the intended meaning where a distinction is actually necessary. In general, the discussion in this document is in terms of a single user and the single user's datasets that are to be mutually synchronized. In practice, however, a server would generally support multiple users. Because transactions and datasets for each user are characterized by a unique user identifier, according to standard concepts of timesharing computing resources among multiple users, the server can be thought of as including a multiplicity of virtual servers and virtual datasets (GUDs), each dedicated to a specific user. Therefore, describing the server in terms of a single virtual user-specific server does not introduce loss of generality.

B. The Synchronization System Exchanges Synchronization Messages

Preferably, the sync server 360 of FIG. 3 is a World Wide Web server, or a Wireless Application Protocol (WAP) server, or the like. (WAP includes standardized protocols, optimized for wireless devices, that support remote global access of WAP content over open communication networks. WAP is further described within the WAP Specifications, e.g., version 1.1, which is hereby incorporated by reference. Version 1.1 of the WAP Specifications is currently available for download via the Internet at the World Wide Web site of wapforum.org.

Preferably, the sync server 360 and its clients (e.g., client accessors) communicate using a synchronization protocol, for example, a synchronization protocol developed by Starfish that enables efficient exchange of synchronization messages called "Action Objects". Action Objects are message units used for sending dataset changes between datasets and for acknowledging such changes. Starfish's Action Object-based synchronization protocols will be further described below, and are further described, for example, in the incorporated, commonly-owned U.S. patent application Ser. Nos. 09/311,781 now U.S. Pat. No. 6,487,560 (filed May 13, 1999) and 09/208,815 now U.S. Pat. No. 6,477,545 (filed Dec. 8, 1998).

III. A Baseline Sync Server Supports Linear Message Processing

A. Introduction

A baseline synchronization system for implementing any synchronization protocol may be built from Starfish synchronization systems that are described, for example, in the incorporated, commonly-owned U.S. patent applications Ser. Nos. 09/715,981 (filed Nov. 17, 2000), 09/347,447 and now U.S. Pat. No. 6,401,104 (filed Jul. 3, 1999), 09/311,781 (filed May 13, 1999) U.S. Pat. No. 6,487,560, or 09/208,815 (filed Dec. 8, 1998) and now U.S. Pat. No. 6,477,545. Such a baseline system is further described below.

B. A Modular View of the Baseline Sync Server

Figure 4:
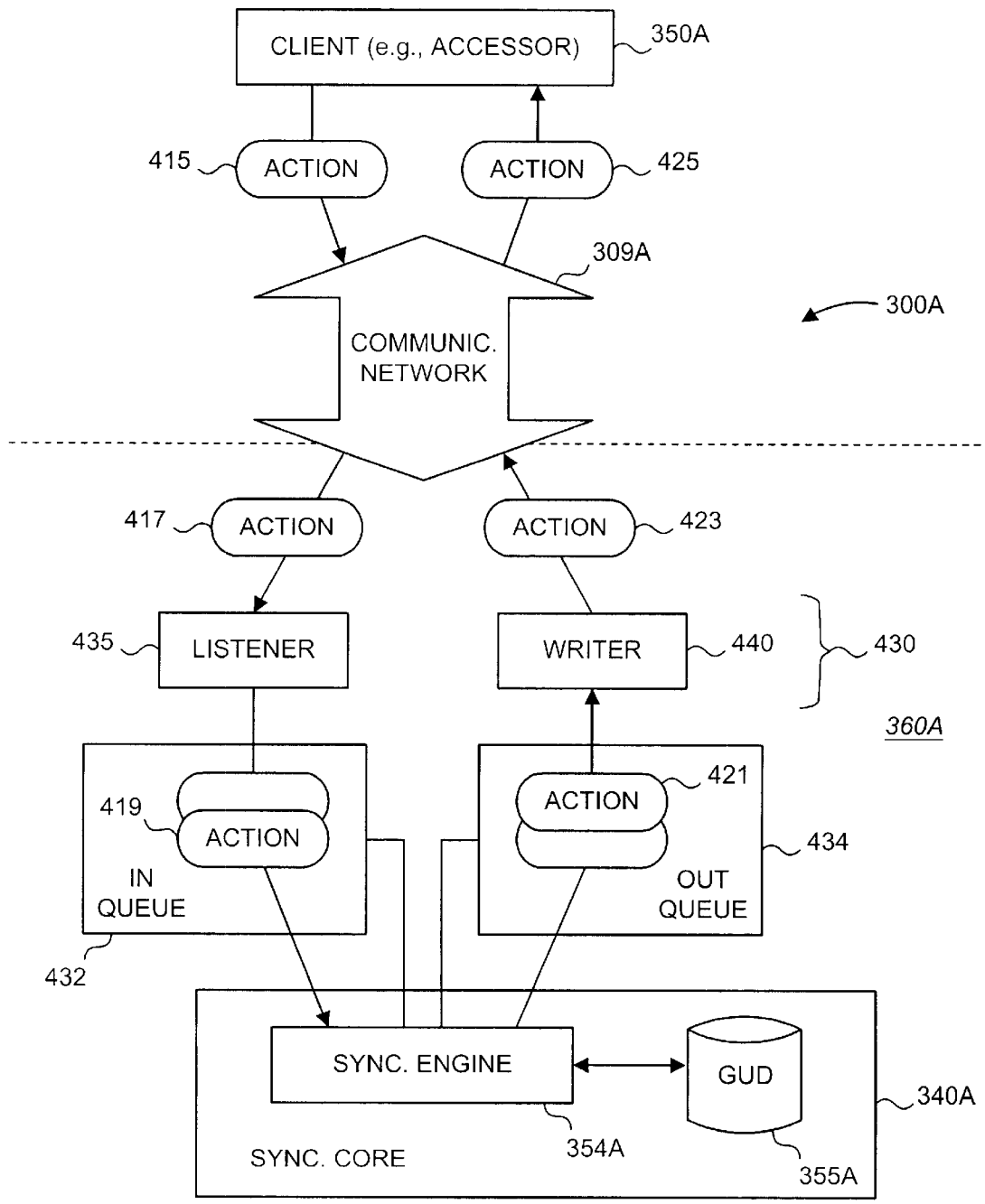
FIG. 4 is a block diagram of a baseline synchronizer from which the present invention may be built.

FIG. 4 is a block diagram that shows a baseline synchronizer 300A from which the present invention may be built. For example, the synchronizer 300A may be a Starfish synchronizer described in the incorporated, commonly owned U.S. patent application having Ser. No. 09/311,781 now U.S. Pat. No. 6,487,560 (filed May 13, 1999). The synchronizer 300A includes a client 350A (e.g., a client accessor) and a sync server 360A that is capable of supporting wireless and/or Internet-based communication. The sync server 360A includes a synchronizer core 340A, a communication layer 430, an input queue 432, and an output queue 434. The synchronizer core 340A communicates with the client 350A by exchanging messages 415, 417, 419, 421, 423, and 425 that may be called Action Objects. The exchange of messages (i.e., Action Objects) is conducted via a communication network(s) 309A that is found in the environment of the synchronizer 300A and via the communication layer 430, the input queue 432, and the output queue 434.

The communication network 309A, from the environment of the baseline synchronizer 300A, may include wireless or wireline networks for providing point-to-point, real-time connections (e.g., sockets, full- or half-duplex connections, and the like) and/or wireless or wireline networks for transferring messages (e.g., paging messages or e-mails). Examples of suitable communication networks include GSM networks (Global System for Mobile Communications), PCS networks (Personal Communication Services), TDMA (Time-Division Multiple Access) networks, CDMA (Code-Division Multiple Access) networks, wireless paging networks, AMPS (Advanced Mobile Phone System) networks, CDPD networks (Cellular Digital Packet Data), GPRS networks (General Packet Radio Services), POTS networks (Plain-Old-Telephone-Service), the Internet, other IP- (Internet-Protocol) or TCP/IP-based (Transmission Control Protocol/IP) networks, networks supporting SMS (Short Messaging Service), networks supporting WAP (Wireless Application Protocol) or HDTP (Handheld Device Transport Protocol), other cellular networks, other paging networks, other digital or analog wireless networks, other wireline networks, other circuit-based or packet-based networks, and like networks.

The client 350A handles access to information in a particular client dataset (not shown) and handles delivery and receipt of information across the communication channel 309A on the client side. The communication layer 430 handles delivery and receipt of information across the channel 309A on the synchronizer core 340A's side. The communication layer 430 includes a listener 435 for receiving and unpackaging (e.g., de-serializing) information from the communication channel 309A into an input queue 432. The communication layer 430 also includes a writer 440 for packaging (e.g., serializing) and sending information onto the communication channel 309A from the output queue 434.

The synchronizer core 340A includes a GUD 355A that stores a super-set of information from all other datasets as a central repository of information, including not only the latest, conflict-resolved values of data records but also status information, including the correspondence, or mapping, of records in the GUD to records in other datasets. The synchronizer core 340A also includes a synchronizer engine 354A that controls and maintains the GUD and works with all client(s) (e.g., client accessor(s)) to collectively drive and control the synchronization process. The synchronization engine 354A works with client(s) by receiving Action Objects via the input queue 432 and sending Action Objects via the output queue 434.

Preferably, the client 350A exists as a software process that runs on a same device as the particular client dataset. The listener 435 and the writer 440 may exist as individual software processes that respectively replenish and withdraw Action Objects from the input queue 432 and output queue 434, respectively, when available. The Action Objects 415, 417, 419, 421, 423, and 425 that are used by the synchronizer core 340A and the client 350A for mutual communication embody a defined format for conveying dataset changes and other information between the synchronizer core 340A and client accessors 350A, in either direction. The Action Objects 415, 417, 423, and 425 are Action Objects that have been packaged (for example, serialized) for transport across the communication channel 309A.

C. The Baseline Sync Server Supports Linear Message Processing

As can be seen from FIG. 4, the baseline sync server 360A is well configured for processing Action Objects in a linear fashion. In particular, the synchronizer core 340A (e.g., its synchronization engine 354A) fully handles each received Action Object from the client 350A in the order received, i.e., in "first in first out" (FIFO) order. More particularly, the synchronizer core 340A will respond to any received Action Object from the client 350A only when all earlier-received Action Objects have been fully handled. In this way, the synchronizer core 340A can guarantee synchronization integrity, according to the goal of the Action Object-based synchronization protocol being used, in a relatively straight-forward and easily understandable manner.

A consequence of the linear processing of all Action Objects from any client 350A is that the client 350A may have to wait a relatively long time to receive an acknowledgment of the Action Objects that it sends. In particular, if the client 350A sends a set of record changes to the sync server 360A, then those record changes must be fully handled and possibly propagated into the GUD 355A of FIG. 4 (subject to conflict resolution) before the client accessor will receive an acknowledgment of the set of changes in response to a later-sent request for acknowledgment. The wait for such handling of record changes (e.g., conflict resolution and propagation into the GUD 355A) can be noticeable, especially in a server environment in which the GUD 355A of FIG. 4 is implemented on an underlying database system (e.g., an Oracle database system) that maintains many datasets for many users.

Figure 5:
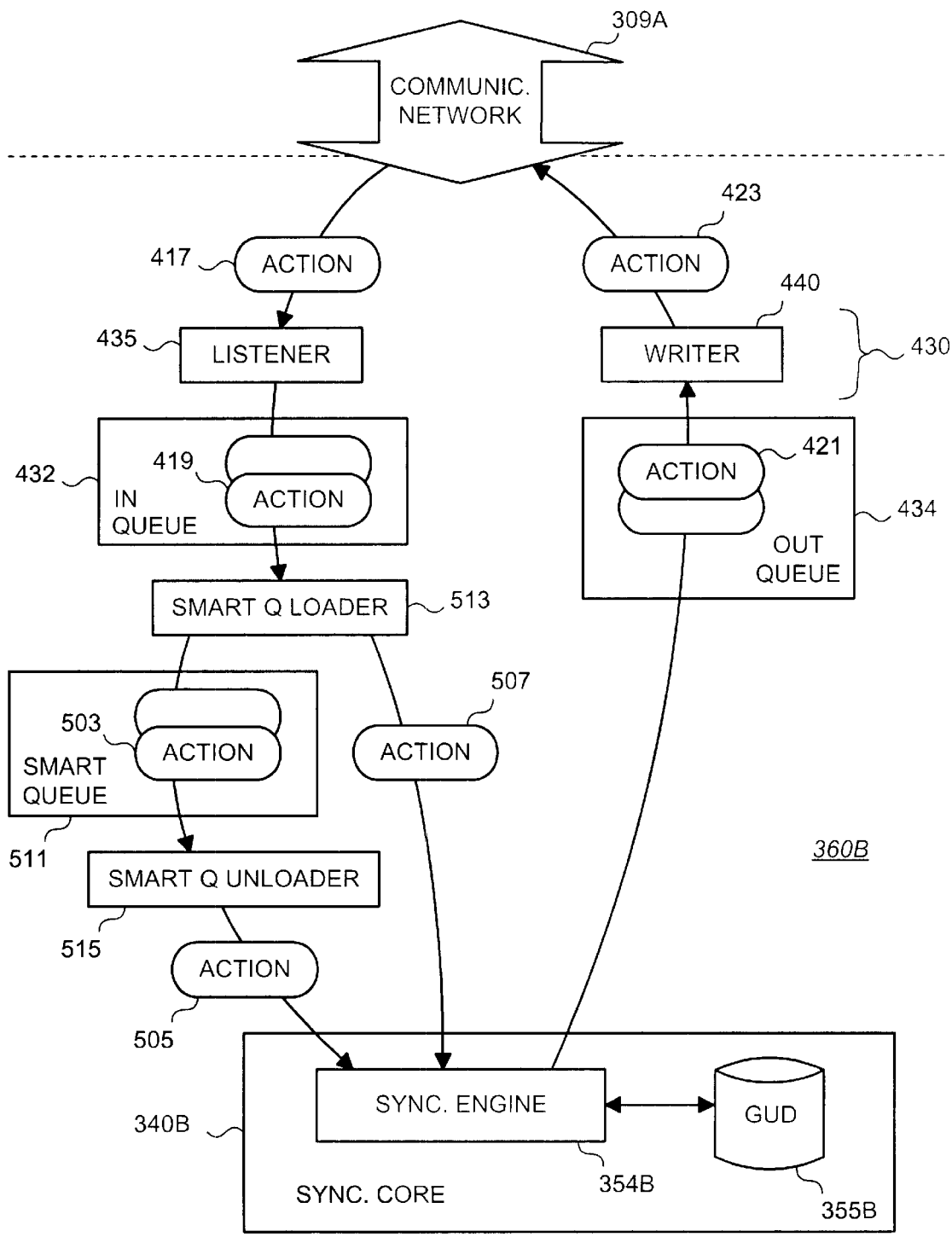
FIG. 5 is a block diagram of a synchronization server according to one embodiment of the present invention.

IV. An Improved Sync Server Supports Faster and More Scalable Message Processing FIG. 5 is a block diagram that shows a sync server 360B, according to the present invention, that improves upon the baseline sync server 360A of FIG. 4. The sync server 360B is built from the sync server 360A of FIG. 4 by adding the additional features and logic, of the present invention, that will be further described. As shown in FIG. 5, portions of the sync server 360B resemble the baseline sync server 360A of FIG. 4. In particular, the sync server 360B includes a synchronizer core 340B, a communication layer 430, an input queue 432, and an output queue 434. The synchronizer core 340B includes a synchronizer engine 354B and a GUD 355B. The synchronizer core 340B communicates with a client (not pictured) by exchanging with the client Action Objects (i.e., messages), including Action Objects 417, 419, 421, 423, 503, 505, 507, and (pictured in FIG. 4) 415 and 425.

Similarly to the baseline sync server 360A of FIG. 4, the sync server 360B of FIG. 5 uses a communication network (s) 309A, the communication layer 430, the input queue 432 and the output queue 434 for exchanging Action Objects. In addition, the sync server 360B includes and uses a smart queue 511, a smart queue loader 513, and a smart queue unloader 515 to intelligently route and pre-process Action Objects from the client for handling. The smart queue loader 513 gets one Action Object 419 at a time, in FIFO order, as received from a client. Then, based on its logic, which will be further described, the smart queue loader 513 either (1) submits the Action Object 419, as the Action Object 507, for immediate, synchronous handling to completion or (2) places the Action Object 419, as the Action Object 503, into the smart queue 511 for later, asynchronous handling to completion. In the preferred embodiment, handling an Action Object to completion, when the Action Object includes a record change, includes propagating the record change, as it affects user data, into the GUD, subject to conflict resolution. If the Action Object 419 is placed into the smart queue 511, as the Action Object 503, then the smart queue loader 513 can proceed to accept a next Action Object 419 in FIFO order, e.g., before the Action Object 503 is (later) handled to completion. The smart queue loader 513 preferably runs as a software process. The smart queue unloader 515 gets one Action Object 503 at a time from the smart queue 511 and submits it, as the Action Object 505, for immediate, synchronous handling to completion. The smart queue unloader 515 preferably runs as a software process, too.

Figure 6A:
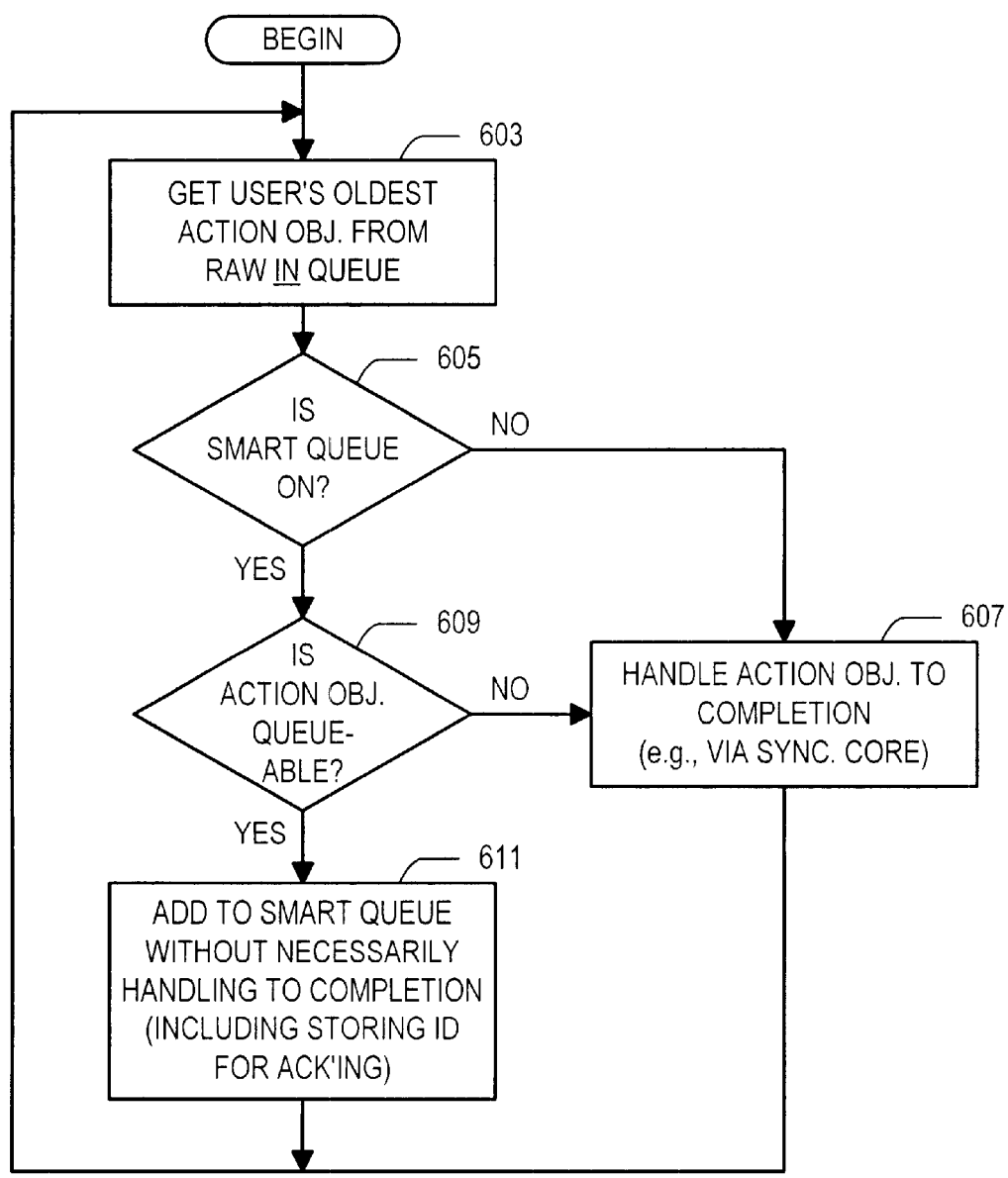
FIG. 6A is a flow chart of a method for handling the queuing of action objects received from a sync client.

V. Processing Action Objects Quickly and Scalably Using the Improved Sync Server A. Time-Consuming Actions Go Into Smart Queue for Deferred Processing FIG. 6A is a flow chart that describes a method 600 executed by the smart queue loader 513 of FIG. 5. As shown in FIG. 6A, in a step 603, the smart queue loader gets (and removes) an Action Object in FIFO order from the raw input queue 432 of FIG. 5, as received from the client. Next, in a step 605 of FIG. 6A, the smart queue loader determines whether the smart queue of the present invention is being used. If the smart queue is not being used (i.e., is disabled), then the smart queue loader, in a step 607, simply submits the Action Object (e.g., to the synchronization engine 354B of FIG. 5) for immediate processing to completion and waits for the successful completion before proceeding back to the step 603 of FIG. 6A to get a next Action Object in FIFO order. Thus, if the smart queue is disabled, then the behavior of the sync server 360B of FIG. 5 reverts to the behavior of the baseline sync server 360A of FIG. 4.

If the smart queue is being used (i.e., is not disabled), then, in a step 609, the smart queue loader determines the identity (i.e., the command or function being invoked) of the Action Object and classifies, based on the identity, the Action Object as being a queueable or non-queue-able Action Object. In the preferred embodiment of the present invention, the smart queue loader is programmed to recognize Action Objects that include record changes (e.g., updates, additions, or deletions) submitted from the client as queue-able, and all other Action Objects (e.g., logins, requests for GUD records) as non-queue-able. More specifically, the smart queue loader classifies the Action Objects that may require write access to the GUD for altering user data in the GUD (e.g., Action Objects that include record changes) as queue-able and all other Action Objects as non-queue-able. If the Action Object is non-queue-able, then the smart queue loader, in the step 607, submits the Action Object (e.g., to the synchronization engine 354B of FIG. 5) for immediate processing to completion and waits for the completion before proceeding back to the step 603 of FIG. 6A to get a next Action Object in FIFO order. If the Action Object is queue-able, then the smart queue loader, in a step 611, places the Action Object into the smart queue, for later processing to completion, and, without waiting for the queued Action Object to be processed to completion, proceeds back to the step 603 to get a next Action Object in FIFO order.

B. Time-Consuming Actions Are Acknowledged Before Fully Processed

In the step 611, when the smart queue loader places an Action Object into the smart queue, the smart queue loader places the identifier (ID) (e.g., the client record identifier) associated with the Action Object into a list, to signify that the Action Object has been officially received and is therefore acknowledgeable. Using this list, after a set of record changes (Action Objects) have been queued into the smart queue, upon receiving a subsequent request from the client for acknowledgment of the record changes, the sync server 360B of FIG. 5 can acknowledge the queued record changes, in the step 607 of FIG. 6A, even though the record changes have not yet all been processed to completion (i.e., have not been propagated into the GUD, subject to conflict resolution). The sync server 360B of FIG. 5 can acknowledge the queued record changes, of course, by returning the IDs in the list to the client in an acknowledgment Action Object (e.g., an AckLastRecSent Action Object). The acknowledgment of not-yet-propagated Action Objects is a promise by the sync server 360B of FIG. 5 that it will not lose the Action Objects and that it can maintain a proper internal state. This promise can be made, as will be further discussed, because the logic employed by the smart queue unloader 515 and the synchronization engine 354B, both of FIG. 5, are aware of the smart queue and can maintain a proper internal state.

C. Action Objects in Smart Queue Are Straightforwardly Processed

Figure 6B:
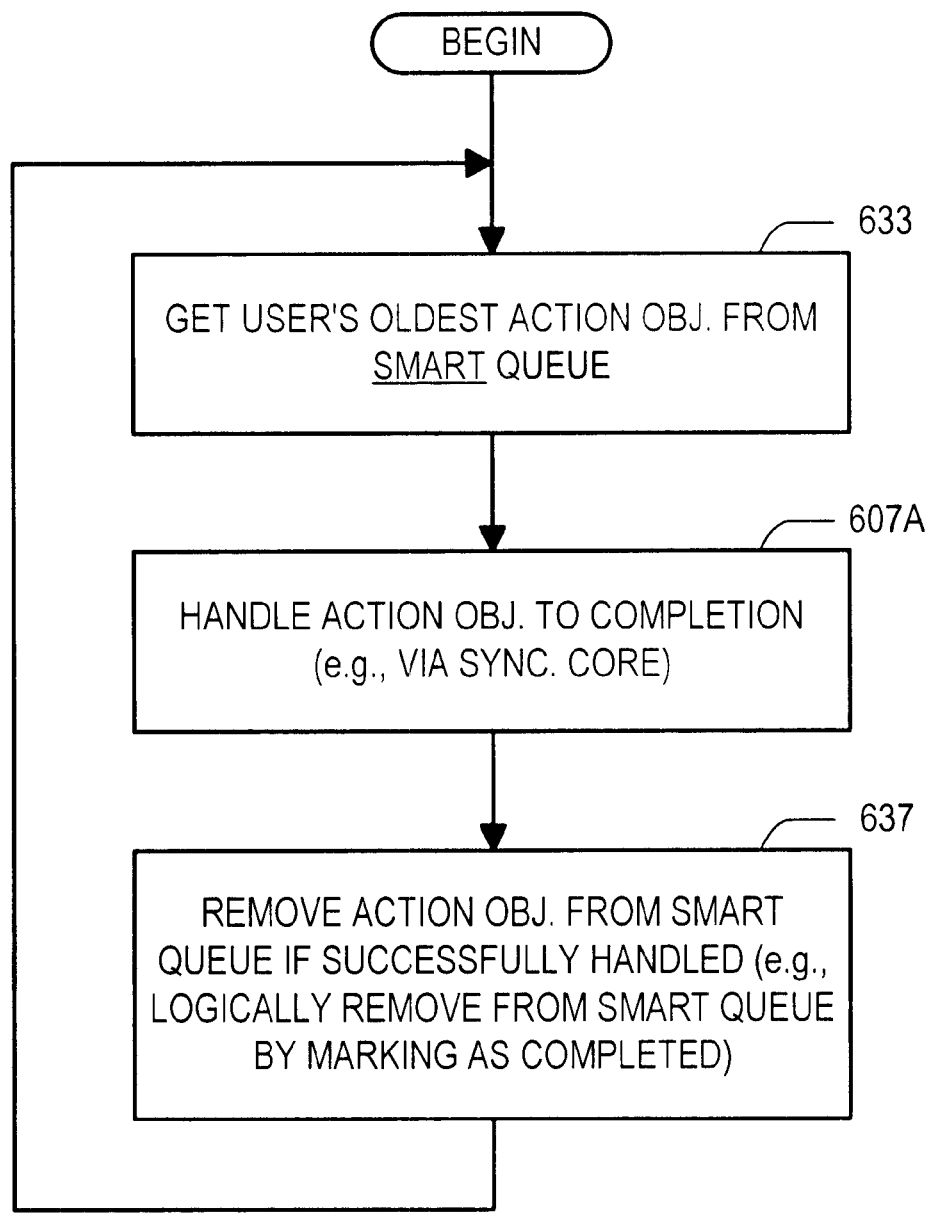
FIG. 6B is a flow chart of a method for processing action objects from a smart queue in one embodiment of the present invention.

FIG. 6B is a flow chart that describes a method 630 executed by the smart queue unloader 515 of FIG. 5. As shown in FIG. 6B, the smart queue unloader, in a step 633, gets (but does not yet remove) an oldest Action Object for the user from the smart queue. Next, in a step 607A, the smart queue unloader submits the Action Object (e.g., to the synchronization engine 354B of FIG. 5) for immediate processing to completion and waits for the completion. Upon successful processing to completion of the Action Object, the smart queue unloader, in a step 637 of FIG. 6B, removes the processed Action Object from the smart queue. This removal is preferably a logical removal (which is faster than a physical removal/overwriting) in which the Action Object is simply marked as completed. Next, the smart queue unloader proceeds back to the step 633 to get a next oldest Action Object for the user.

D. Processing Non-queued Action Objects May Depend on Smart Queue

Figure 6C:
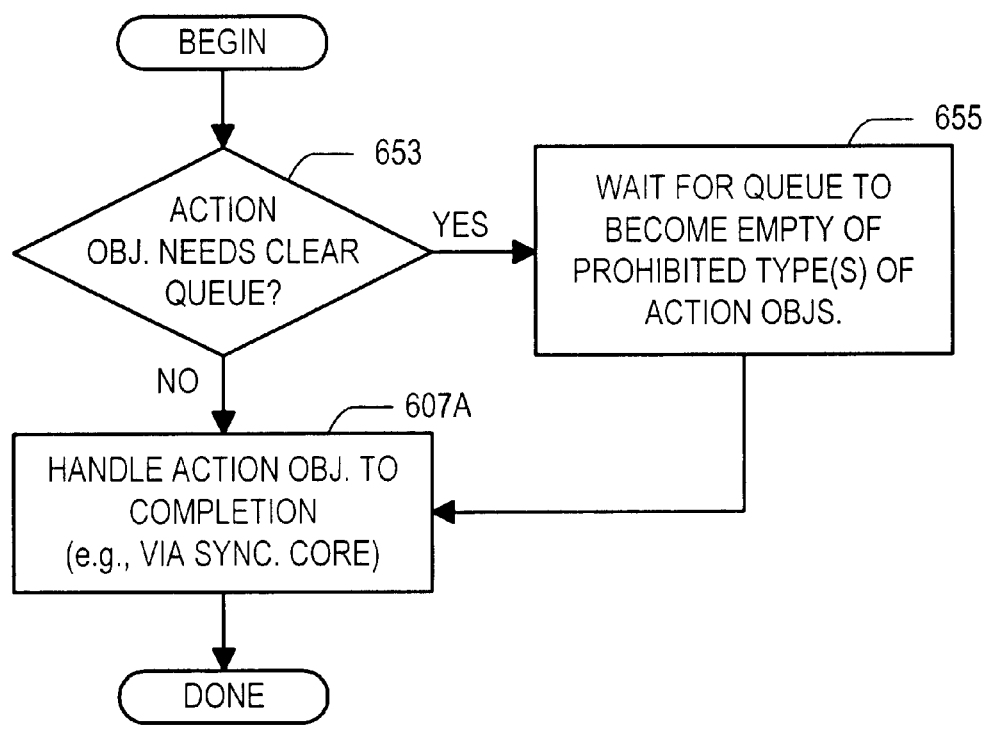
FIG. 6C is a flow chart of a method for handling the processing of an action object that has not been queued.

FIG. 6C is a flow chart that further describes a method 607B for processing to completion an Action Object (e.g., by the synchronization engine 354B of FIG. 5) that was not queued in the smart queue. The method 607B of FIG. 6C embodies the step 607 of FIG. 6A. As shown in FIG. 6C, in a step 653, the synchronization engine (and/or the smart queue loader 513 of FIG. 5) determines the identity (i.e., the command or function being invoked) of the Action Object to be processed and classifies, based on the identity, the Action Object as either requiring or not requiring that the smart queue be free of certain types of Action Objects for the user (e.g., free of all Action Objects for the user). In the preferred embodiment of the present invention, the synchronization engine (and/or the smart queue loader) is programmed to recognize the following to-be-processed Action Objects as not requiring any particular state of the smart queue: (1) a Login Action Object or (2) an Action Object that requests acknowledgment of sent record changes (e.g., an AckLastRecSent Action Object). Conversely, in the preferred embodiment of the present invention, the synchronization engine (and/or the smart queue loader) is programmed to recognize the following to-be-processed Action Objects as requiring the smart queue to be free of at least all Action Objects that contain record changes (e.g., free of all Action Objects): an Action Object that requests up-to-date GUD records (e.g., a RetrieveRecords Action Object).

If the Action Object to be processed requires that the smart queue be free of certain types of Action Objects for the user, then the method 607B (e.g., the software execution thread running the method 607B of FIG. 6C), in a step 655, waits until the smart queue is free of the certain types of Action Objects for the user (e.g., is completely empty for the user). Once the smart queue is free (due to action of the smart queue unloader 515 of FIG. 5) of all objected-to Action Objects, the synchronization engine (and/or the smart queue loader), in a step 607A of FIG. 6C, immediately processes the Action Object to completion and returns the success or failure code of the processing of the Action Object. The step 607A for handling Action Objects to completion is as in the baseline synchronization server 360A of FIG. 4, and is further discussed in connection with FIG. 4 (e.g., in the incorporated patent applications mentioned earlier in connection with FIG. 4).

VI. Scaling Up the Synchronization Server

A. The Sync Server can Handle Multiple Users Engaged in Synchronization

Referring to FIG. 5, in the preferred embodiment of the present invention, the smart queue loader 513 and the smart queue unloader 515 are executing software processes. The synchronization engine 354B is also an executing software process, or a software function call, that receives messages (e.g., Action Objects) from the smart queue loader 513 and/or the smart queue unloader 515. The sync server 360B in fact can be used, as depicted in FIG. 5, to handle synchronization for multiple users. The listener 435 maintains connections (e.g., sockets over the Internet) to many users' devices (e.g., clients), all of which may be engaged in synchronization with the sync server 360B. The smart queue loader 513 timeshares its processing cycles among the sync server 360B's many users using any reasonable scheme. For example, according to one timesharing scheme, the smart queue loader 513 loops over all users, and for each user gets up to N of that user's Action Objects (if any) from the raw input queue 432 and routes/processes the up-to-N Action Objects according to the method 600 of FIG. 6A. Similarly, the smart queue unloader 515 timeshares its processing cycles among the sync server 360B's many users using any reasonable scheme. For example, according to one timesharing scheme, the smart queue unloader 515 loops over all users, and for each user gets up to M of that user's Action Objects (if any) from the smart queue 511 and routes/processes the up-to-M Action Objects according to the method 600 of FIG. 6A. The numbers N and M may be any reasonable number, according to the system developer's preference, and depending on the performance characteristics obtained in practice for each particular implementation of the sync server 360B.

B. Multiple Processes, e.g., on Multiple Processors, May be Used

In the preferred embodiment of the present invention, multiple instances of each of the listener 435, the smart queue loader 513 and the smart queue unloader 515 are run simultaneously. For example, three instances each of the smart queue loader 513 and the smart queue unloader 515 may be used. Preferably, standard resource locking techniques are used to ensure that, for any user, only one instance of the smart queue loader 513 will handle Action Objects from any one synchronization session involving the user. Similarly, for any user, preferably only one instance of the smart queue unloader 515 will handle Action Objects from any one synchronization session involving the user.

VII. Example Synchronization Communication Sequences

A. Introduction

As mentioned above, Starfish's Action Object-based synchronization protocols are further described, for example, in the incorporated, commonly-owned U.S. patent applications Ser. No. 09/311,781 now U.S. Pat. No. 6,487,560 (filed May 13, 1999) and 09/208,815 now U.S. Pat. No. 6,477,545 (filed Dec. 8, 1998). Nevertheless, it may be helpful in the present document to selectively illustrate a particular Action Object-based synchronization protocol with examples. FIGS. 7A and 7B each illustrate an example communication sequence between a client (e.g., client accessor) and the sync server 360 of FIG. 3. The communication sequences of FIGS. 7A and 7B may be executed in that order to thereby synchronize the client dataset and the sync server 360 of FIG. 3, assuming that all synchronization messages are handled in sequence and assuming that the client dataset and the GUD are locked against user changes during the entire sequence. In FIGS. 7A and 7B, the synchronization style is for each dataset (of the client dataset and the sync server dataset) to send only those of their records that have changed without the other's known knowledge (e.g., changed since a previous synchronization of the two datasets). The communication sequences of FIGS. 7A and 7B are similar to sequences also discussed, for example, in the incorporated, commonly owned U.S. patent application Ser. No. 09/311,781 now U.S. Pat. No. 6,487,560 (filed May 13, 1999).

B. Sending Changes to Sync Server

In FIG. 7A, labeled as Table 1, the client has already "logged in" to the sync server to begin a communication session that includes a two-way communication connection (e.g., a socket connection over the Internet). As shown in FIG. 7A, the client (e.g., client accessor) sends a set of "fresh" changes to the sync server, in the form of a record update and a record deletion (at times 1 and 3, respectively). (A record in one dataset is "fresh" with respect to another dataset if the record includes values or deletion status of which the other dataset may be ignorant—e.g., if the record has been added, modified, or deleted since a previous synchronization of the one dataset with the other dataset.) The client then sends a single request (time 5) for confirmation from the sync server of the receipt of those changes. The sync server, in response, sends a confirmation message (time 7) that indicates which changes were actually received by the sync server. For example, the confirmation message may include unambiguous identifiers for the received changes, such as might have been sent by the client as a part of the changes. The client receives the confirmation message (time 8). For the changes that have been acknowledged as received, the client marks the corresponding client record as being no longer fresh with respect to the GUD. In this way, even if the synchronization is later interrupted, the client will not have to resend the received changes to the GUD in a subsequent synchronization. If the client determines that not all of the sent set of changes have been confirmed, then an error has occurred, and the client would take appropriate error-handling action, such as resending the changes that have not been confirmed, or aborting the synchronization. (Generally, the client would try again later, hopefully with better success.) If the client has further set(s) of fresh changes to send to the GUD, then it would send them and await confirmation of their receipt in the same manner as shown for the times 1–8.

As a technical matter, note that although FIG. 7A shows the second change (i.e., the record deletion) as being sent by the client (time 3) later than receipt (time 2) by the sync server of the first change in the set of changes, nothing depends on the actual order, and in fact this order is not necessarily the order obtained in practice. Similarly, the request by the client (sent at time 5) for confirmation of receipt of the set of changes is not necessarily sent by the client later than receipt of the changes (shown at times 2 and 4) by the sync server.

The method 600 of FIG. 6A may be illustrated using the example communication sequence of FIG. 7A. Referring to FIG. 5, the sync server 360B of the present invention will, if the smart queue is turned on, place the UpdateRecord and DeleteRecord Action Objects (received at times 2 and 4 of FIG. 7A) into the smart queue, placing the ID for each of the Action Objects into a list, signifying that the Action Objects have been officially received and are therefore acknowledgeable. The sync server 360B will subsequently acknowledge, in the AckLastRecSent Action Object (sent at time 7 of FIG. 7A), the correct receipt of the UpdateRecord and DeleteRecord Action Objects. In particular, the sync server 360B of FIG. 5 will acknowledge the correct receipt even if the UpdateRecord and DeleteRecord Action Objects are still in the smart queue and not yet propagated into the GUD, subject to conflict resolution (i.e., not yet processed to completion).

C. Requesting and Receiving Changes from the Sync Server

In FIG. 7B, labeled as Table 2, the client has already "logged in" to the sync server and is in a communication session that includes a two-way communication connection (e.g., a socket connection over the Internet). As shown in FIG. 7B, the client sends a request (at time 23) to the sync server, for fresh changes from the GUD. In response, the sync server sends a set of fresh changes (times 25, 27, 29) followed by a request (time 31) for the client to confirm receipt of those changes. The client, in response, sends a confirmation object (time 33) that indicates which changes were actually received by the client. For example, the confirmation object may include unambiguous identifiers for the received changes, such as might have been sent by the sync server as a part of the changes. The sync server receives the confirmation object (time 34). If the sync server determines that not all of the sent set of changes have been confirmed, then an error has occurred, and the sync server would take appropriate error-handling action, such as resending the changes that have not been confirmed, or aborting the synchronization. (Generally, the server would try again later, hopefully with better success.) If the sync server has further set(s) of fresh changes to send to the client, then the sync server would, in the same manner as shown for the times 25–34, send them and await confirmation of their receipt.

If the sync server has no more fresh changes for the client, it will send an indication of this fact to the client, for example, using a special field in its request for acknowledgment (as used at time 31) or using a wholly different signal (not shown). In any event, once the client receives this indication, the client sends (time 35) the client record IDs for records newly added in response to changes from the sync server so that the sync server can record the mapping of these new records to their corresponding records in the GUD. (The sync server already has the client IDs of all other client records, from prior synchronization activity.) The client requests confirmation (time 37) of the sync server's receipt of these record IDs. The sync server supplies such confirmation in response (time 39), and the client receives such confirmation (time 40).

Appended herewith as an Appendix A are source code listings providing further description of the smart queue loader of the present invention, according to the preferred embodiment. Appended herewith as an Appendix B are source code listings providing further description of the smart queue unloader of the present invention, according to the preferred embodiment. While the invention is described in some detail with specific reference to a single, preferred embodiment and certain alternatives, there is no intent to limit the invention to that particular embodiment or those specific alternatives.

APPENDIX A

```
/*
 * This handles a set of requests (actions objects) read
 * by the listener component. Some requests, such as login
 * and logout, are handled locally, while others are
 * handled by the core engine.
 *
 * @param o the thread being observed
 * @param arg the action object
 */
1:  public void doWork(final ActionMgr src,
2:                    final ActionObject [ ] action)
3:  {
4:      if (action [0].getActionType( ) = =
5:                      ActConst.ACTION_LOGIN) {
6:          // if action is LOGIN, simply process it now
7:          try {
8:              performLogin
9:                      new ActionLoginSrv(action[0]));
10:             Verify.t(action.length = = 1);
11:         } catch (SocketException e) {
12:         } catch (IOExcaption e) {
13:             Assert.except(e);
14:         } catch (ExtRoutineException e) {
15:             ExtRoutine.get( ).log(
16:                 "QMgrObserver.doWork caught external" +
17:                 "routine exception", e, null);
18:         }
19:     } else { // action is not LOGIN
20:         try {
21:             if (!src.getSession( ).isInteraDevice( ) &&
22:                 Configuration.getBoolean(
23:                     Configuration.TSS_QUEUE_UPDATES))
24:             {       // here, the smart queue is on
25:                 switch (action[0].getActionType( ))
26:                 {       // add queue-able actions to queue
27:                     case ActConst.ACTION_OVERWRITE_RECORD:
28:                     case ActConst.ACTION_UPDATE_RECORD:
29:                     case ActConst.ACTION_DELETE_RECORD:
30:                         ((ActionServerMgr)
31:                             src).addToActionResponseList(
32:                                 action);
33:                         // fall through!!!
34:                     case ActConst.ACTION_INSERT_RECORD:
35:                         addToQueue(src, action);
36:                         break;
37:                         // process non-q-able actions now
38:                     default:
39:                         processAction(
40:                             (ActionServerMgr) src, action);
41:                 }
42:             }
43:             else    // here, the smart queue is off
44:                     // process the actions now
45:                 processAction(
46:                     (ActionServerMgr) src, action);
47:
```

APPENDIX A-continued

```
48:            } catch (DataDeletedException ex) {
49:            } catch (NonAdminUserException ex) {
50:            } catch (IOException ex) {
51:                Assert.except (e);
52:            }
53:        }
54:  }
55:
56:
    /*
     * This adds a set of actions to the queue.
     */
 1: private   static void addToQueue(
 2:              final ActionMgr actionMgr,
 3:              final ActionObject[ ] action)
 4:                  throws IOException
 5: {
 6:         // misc. housekeeping
 7:         final SessionInfo session = actionMgr.getSession( );
 8:         ByteArrayOutputStream tmpBaotStream =
 9:                  new ByteArrayOutputStream( );
10:         ActionOutputStream out =
11:                  new ActionOutputStream(tmpBaotStream);
12:         TSSAccountID accountID =
13:                  actionMgr.getSession( ).getAccountID( );
14:         ReadWriteXact trans = new ReadWriteXact( );
15:         boolean commit = false;
16:
17:         try {
18:             final int len = action.length;
19:
20:             // process each action being queued
21:             for (int i = 0; i < len; i++) {
22:                     // sanity check: is a queue-able action?
23:                     switch (action[i].getActionType( ))
24:                     {
25:                         case ActConst.ACTION_OVERWRITE_RECORD:
26:                         case ActConst.ACTION_UPDATE_RECORD:
27:                         case ActConst.ACTION_DELETE_RECORD:
28:                         case ActConst.ACTION_INSERT_RECORD:
29:                             break;
30:                         default:
31:                             Trace.l1("Unexpected Action type: " +
32:                                 action[i].getActionType( ));
33:                     }
34:
35:                     // package actions into a chunk for queue
36:                     out.writeAction(action[i]);
37:             }
38:
39:             // insert the chunk of actions into queue
40:             InsertQItem.execute(
41:                 trans, accountID.getValue( ),
42:                 session.getDeviceName( ), 5, 'n',
43:                 tmpBaotStream.toByteArray( ),
44:                 new Timestamp(1000L *
45:                     session.getSentTime( ).getTime( )),
46:                 new Timestamp(1000L *
47:                     session.getReceivedTime( ).getTime( ))
48:             );
49:
50:             // increment the counter of # of chunks in Q
51:             int count = UpdateQLockIncrement.execute(
52:                         trans,1,accountID.getValue( ));
53:             if (count == 0) {
54:                 try {
55:                     InsertQLock.execute(
56:                         trans, accountID.getValue( ), 1);
57:                 }
58:                 catch (DbActionExeption e) {
59:                     count = UpdateQLockIncrement.execute(
60:                         trans,1,accountID.getValue( ));
61:                     Verify.t(count == 1);
62:                 }
63:             }
64:
65:             commit = true;
66:         }
```

APPENDIX A-continued

```
67:        finally
68:        {
69:                //if errors, roll back the add to queue
70:                // if no errors, commit the add to the queue
71:            trans.close(
72:                    commit ? trans.COMMIT: trans.ROLLBACK);
73:            ((ActionServerMgr)actionMgr).sendNullAction( );
74:        }
75: }
76:
```

APPENDIX B

```
 1:    // top-level routine for processing queue's items
 2:    public void run( )
 3:    }
 4:        Trace.always(m__name + " started");
 5:        long accountId = 0;
 6:        long lowBound = 0;
 7:        for (;;) {
 8:            m_status = STATUS_MAIN_LOOP;
 9:            try {
10:                purgeCompletedItems( );
11:            }
12:            catch (Exception e) {
13:                e.printStackTrace( );
14:            }
15:
16:            try {
17:                accountId = getNextAccount(lowBound);
18:                Verify.t(accountId != 0);
19:
20:                if (! secureLock(accountId)) {
21:                    lowBound =0 accountId + 1;
22:                    cotinue;
23:                }
24:
25:                try {
26:                    for (int i = 0;i < 3; i++) {
27:                        Trace11(m__name +
28:                                ": serving account " +
29:                                accountId);
30:                        if (! serviceAccount(accountId))
31:                            break;
32:                    }
33:                }
34:                finally {
35:                    releaseLock(accountId);
36:                }
37:            }
38:            catch (Exception e) {
39:                e.printStackTrace( );
40:            }
41:            lowBound = accountId + 1;
42:        }
43: }
 1:    // do work on an item
 2:    private    void doWork (
 3:            long accountId,
 4:            long itemId,
 5:            String deviceName,
 6:            Timestamp sentTime,
 7:            Timestamp receivedTime,
 8:            byte[ ] data)
 9:            throws Exception
10: {
11:        final String s = m_status;
12:        m_staus = STATUS_PROCESS_ITEM;
13:        try {
14:            Trace.l1(m__name + ": servicing account " +
15:                        accountId);
16:            SessionInfo session = null;
17:            QuotaInfo quota = null;
18:            boolean commit = false;
19:
```

APPENDIX B-continued

```
20:         // login
21:         TSSDate sent =
22:             new TSSDate(sentTime.getTime( ) / 1000L);
23:         TSSDate received =
24:             new TSSDate(receivedTime.getTime( ) /
25:                                      1000L);
26:         session = SessionMgr.logonAccountNoValidate
27:                                      accountId,
28:                                      deviceName,
29:                                      sent,
30:                                      received,
31:                                      null);
32:
33:         // get action ojects from byte stream, process
34:         Vaector v = new Vector(20);
35:         ByteArrayInputStream byteStream =
36:                     new ByteArrayInputStream(data);
37:         ActionInputStream in =
38:                     new ActionInputStream(byteStream);
39:         while (in.available( ) !=0) {
40:             ActionObject t = in.readAction( );
41:             v.addElement(t);
42:             Trace.l1(t.actionToString( ));
43:         }
44:
45:         // check that we handle these actions
46:         ActionObject[ ] ao = new ActionObject[v.size( )];
47:         for (int i = 0; i < ao.length; i++) {
48:             ao[i] = (ActionObject) v.elementAt(i);
49:             switch (ao[i].getActionType( )) {
50:             case ActionConstants.ACTION_UPDATE_RECORD:
51:             case ActionConstants.ACTION_OVERWRITE_RECORD:
52:             case ActionConstants.ACTION_DELETE_RECORD:
53:                 break;
54:             default:
55:                 Assert.always(
56:                     "Invalid Action Type detected in Q: "
57:                     + ao[i].getActionType( ));
58:             }
59:         }
60:         Assert.t(session.getDeviceID( ) != null,
61:                 session.getLoginName( ) + "." +
62:                 session.getDeviceName( 0 + " : " +
63:                 "null device id");
64:
65:         ReadWriteXact trans = new ReadWriteXact( );
66:         try {
67:             QActionMgr actionMgr = null;
68:             if (!Configuration.getBoolean(
69:                     Configuration.INTERNAL_RETRY_BATCH)
70:                 || ao.length <= 1)
71:                 actionMgr = new QActionMgr(session);
72:             quota = session.cloneQuota( );
73:
74:             // do actual work (send to sync engine)
75:             CoreEngine.processAction(
76:                     trans, ao, actionMgr, session);
77:             quota = null;
78:             commit = true;
79:         } catch (QuotaExceededException ex) {
80:             ;
81:         } catch (DataDeletedException ex) {
82:             ;
83:         } catch (DuplicateLoginNameException ex) {
84:             ;
85:         } catch (NoLoginNameForNewAccountException ex) {
86:             ;
87:         } catch (NonAdminUserException ex) {
88:             ;
89:         } finally {
90:             if (! commit) {
91:                 trans.chain(trans.ROLLBACK);
92:
93:                 if (Configuration.getBoolean(
94:                         Configuration.INTERNAL_RETRY_BATCH)
95:                     && ao.length > 1)
```

APPENDIX B-continued

```
 96:        {
 97:            session.setQuota(quota);
 98:            QActionMgr actionMgr =
 99:                    new QActionMgr(session);
100:            ActionObject[ ] aol =
101:                    new ActionObject[1];
102:            for (int i = 0; i < ao.length; i++) {
103:                aol[0] = ao[i];
104:                boolean commit1 = false;
105:                try {
106:                    quota = session.cloneQuota( );
107:                    CoreEngine.processAction(
108:                            trans, aol,
109:                            actionMgr, session);
110:                    quota = null;
111:                    commit1 = true;
112:                } catch (QuotaExceededException
113:                                ex) {
114:                    ;
115:                } catch
116:                    (DataDeletedException ex) {
117:                    ;
118:                } catch
119:                    (DuplicateLoginNameException
120:                        ex) {
121:                    ;
122:                } catch
123:                    (NoLoginNameForNewAccountException
124:                        ex) {
125:                    ;
126:                } catch
127:                    (NonAdminUserException ex) {
128:                    ;
129:                } finally {
130:                    if (!commit1) {
131:                        trans.chain(
132:                            trans.ROLLBACK);
133:                        session.setQuota(quota);
134:                    }
135:                    if (i < ao.length - 1) {
136:                        boolean commit1done =
137:                                false;
138:                        try {
139:                            ByteArrayOutputStreambout = new ByteArrrayOutputStream( );
140:                            ActionOutputStreamout = new ActionOutputStream(bout);
141:                            for (int j = i + 1;
142:                                j < ao.length;
143:                                j++) out.writeAction(ao[j]);
144:                            int count1 =
145:                            UpdateQItem.execute(
146:                                trans,
147:                                bout.toByteArray( ),
148:                                itemId);
149:                            Verify.t(count1 = =
150:                                1);
151:                            commit1done = true;
152:                        } finally {
153:                            trans.chain(
154:                                commit1done ?
155:                                trans.COMMIT :
156:                                trans.ROLLBACK);
157:                        }
158:                    }
159:                }
160:            }
161:        }
162:    }
163:
164:        // mark the item as completed
165:    ginal String ss = m_status;
166:    try {
167:        m_status = STATUS_MARK_COMPLETED;
168:        int count;
169:        count = UpdateQItemCompleted.execute(
170:                trans, accountId, itemId);
171:        Verify.t(count = = 1);
172:
```

APPENDIX B-continued

```
173:                    m_status = STATUS_DECR_QUEUE_LENGTH;
174:                    count = UpdateQLockIncrement.execute(
175:                                    trans, -1, accountId);
176:                    Verify.t(count = = 1);
177:                } finally {
178:                    trans.commit( );
179:                    m_status = 0 ss;
180:                }
181:
182:                // clean up the temporary session
183:                m_status = STATUS_PROCESS_ITEM_CLEANUP;
184:                if (session != null) {
185:                    if (quota != null)
186:                        session.setQuota(quota);
187:                    SessionMgr.removeSession(
188:                                    session.getSessionID( ));
189:                }
190:                m_status = ss;
191:            }
192:        }
193:        finally {
194:            m_status = s;
195:        }
196:    }
197:
 1:    // do some work for this account
 2:    private boolean serviceAccount(long accountId)
 3:            throws Exception
 4:    {
 5:    final String s = m_status;
 6:        m_status = STATUS_FIND_ACCOUNT;
 7:        try {
 8:            long itemID = 0;
 9:            int privelege;
10:            Timestamp sentTime = 0 null;
11:            Timestamp receivedTime = null;
12:            String deviceName = null;
13:
14:            byte[ ] itemData = null;
15:            ReadOnlyXact roTrans = new ReadOnlyXact( );
16:            try {
17:                // Read first item queued by this user
18:                SelectQItemByAccount q =
19:                    new SelectQItemByAccount(roTrans,
20:                                    accountId,
21:                                    accountId);
22:                SelectQItemByAccount.ResultRow r = null;
23:                try {
24:                    q.execute( );
25:                    r = q.nextRow( );
26:                }
27:                finally {
28:                    q.close( );
29:                }
30:
31:                // If none found, return
32:                if (r = = null)
33:                    return false;
34:
35:
36:                privilege = r.privilege;
37:                itemId = r.itemId;
38:                deviceName = r.deviceName;
39:                sentTime = r.sentTime;
40:                receivedTime = r.receivedTime;
41:
42:                itemData = r.shortPart;
43:                if (itemData = = null || itemData.length = = 0)
44:                    itemData = r.longPart;
45:            }
46:            finally {
47:                roTrans.commit( );
48:            }
49:
```

APPENDIX B-continued

```
50:            // Work on this item
51:            doWork(accountId, ItemId,
52:                    deviceName,
53:                    sentTime,
54:                    receivedTime,
55:                    itemData);
56:            return true;
57:         }
58:         finally {
59:             m_status = s;
60:         }
61: }
62:
 1: // get next account to handle
 2: private long getNextAccount(long lowBound)
 3: {
 4:     String s = m_status;
 5:     m_status = STATUS_FIND_ACCOUNT;
 6:     try {
 7:         retry:
 8:         for (;;) {
 9:             ReadWriteXact trans = ReadWriteXact9 );
10:             try {
11:                 // find first non-locked account
12:                 // whose account id exceeds lowBound
13:                 SelectQLockFirstFree q =
14:                     new SelectQLockFirstFree(trans,
15:                                         lowBound);
16:                 SelectQLockFirstFree.ResultRow r = null;
17:                 try {
18:                     q.execute( );
19:                     r = q.nextRow( );
20:                 }
21:                 finally {
22:                     q.close( );
23:                 }
24:                 // if not found, wait a little
25:                 if (r == null || r.accountId == 0) {
26:                     trans.commit( );
27:                     trans = null;
28:                     if (lowBound ==0) {
29:                         try {
30:                             final int interval =
31:                                 Configuration.getInt(Configuration.TSS_QUEUE_WORKER_SLEEP_INTERVAL );
32:                             m_status = STATUS_SLEEP;
33:                             Thread.sleep(1000L *
34:                                         interval);
35:                             m_status =
36:                                 STATUS_FIND_ACCOUNT;
37:                         }
38:                         catch (Exception e) {
39:                             ;
40:                         }
41:                     }
42:
43:                     // now retry, start from lowBound of 0
44:                     lowBound = 0;
45:                     continue retry;
46:                 }
47:
48:                 // found it.
49:                 return r.accountId;
50:             }
51:             finally }
52:                 if (trans != null)
53:                     trans.rollback( );
54:             }
55:         }
56:     }
57:     finally {
58:         m_status = s;
59:     }
60: }
```

What is claimed is:

1. A method for processing a plurality of synchronization messages received from a synchronization client, the method comprising:

receiving said plurality of synchronization messages from the synchronization client and controlling the queuing of said messages according to the following rules:

if a message is queueable, placing the message on a queue for possible nonsequential processing and proceeding to receive another message; and if a message is nonqueueable, making the message available for immediate processing as an unqueued message and waiting until the message is processed before proceeding to receive another message; and processing said plurality of synchronization messages, according to the following rules:

if there is at least one queued message and there is no unqueued message, processing the next queued message;

if there is an unqueued message and there is no queued message, processing the unqueued message;

if there is at least one queued message and there is an unqueued message, then:

if the unqueued message requires that the queue be cleared before processing the unqueued message, processing the next queued message; otherwise processing the unqueued message;

reading a change identifier from a change message;

writing the change identifiers to a change ID list; and reading the change identifiers from the change ID list to prepare a change confirmation message.

2. The method of claim 1, wherein messages received from the synchronization client are initially placed in an input queue.

3. The method of claim 1, wherein change messages are queueable and all other messages are unqueueable.

4. The method of claim 1, wherein processing the change message involves performing a conflict resolution and entering the change into a reference dataset if the change survives the conflict resolution.

5. A synchronizer for synchronizing data records on a synchronization client with data records in a reference dataset wherein the synchronization client sends messages to the synchronizer during a synchronization process, the synchronizer comprising:

an input queue for initially queuing messages received from the synchronization client;

a smart queue for queuing messages that are determined to be queueable;

a smart queue loader for retrieving a message from the input queue arid, if the message is queueable, placing the message on the smart queue and proceeding to retrieve another message from the input queue, or, if the message is not queueable, making the message available for immediate processing as an unqueued messaged and waiting until the message is processed before proceeding to retrieve another message from the input queue;

a synchronization engine for receiving messages one at a time from either the smart queue or directly from the smart queue loader, processing the synchronization messages, and making any required changes to the reference dataset, wherein the synchronization engine receives messages from the smart queue or the smart queue loader according to the following rules:

if there is at least one queued message and there is no unqueued message, receiving and processing the next queued message;

if there is an unqueued message and there is no queued message, receiving and processing the unqueued message;

if there is at least one queued message and there is an unqueued message, then:

if the unqueued message requires that the queue be cleared before processing the unqueued message, receiving and processing the next queued message; otherwise receiving and processing the unqueued message; and a change ID list;

wherein, when the smart queue loader receives a change message from the synchronization client, the smart queue loader reads a change identifier from the change message and writes the change identifier into the change ID list, and wherein, when the synchronization engine receives a message requesting confirmation of received changes, the synchronization engine reads change identifiers from the change ID list and prepares a change confirmation message.

6. The synchronizer of claim 5, further comprising a listener for receiving messages from a communications channel between the synchronization client and the synchronizer, and for placing the messages into the input queue.

7. The synchronizer of claim 5, further comprising a smart queue unloader for retrieving messages from the smart queue and making the messages available for processing by the synchronization engine.

8. A synchronizer for synchronizing data records on a synchronization client with data records in a reference dataset wherein the synchronization client sends messages to the synchronizer during a synchronization process, the synchronizer comprising:

an input queue for initially queuing messages received from the synchronization client;

a smart queue for queuing messages that are determined to be queueable;

a smart queue loader for retrieving a message from the input queue and, if the message is queueable, placing the message on the smart queue and proceeding to retrieve another message from the input queue, or, if the message is not queueable, making the message available for immediate processing as an unqueued messaged and waiting until the message is processed before proceeding to retrieve another message from the input queue; and a synchronization engine for receiving messages one at a time from either the smart queue or directly from the smart queue loader, processing the synchronization messages, and making any required changes to the reference dataset, wherein the synchronization engine receives messages from the smart queue or the smart queue loader according to the following rules:

if there is at least one queued message and there is no unqueued message, receiving and processing the next queued message;

if there is an unqueued message and there is no queued message, receiving and processing the unqueued message;

if there is at least one queued message and there is an unqueued message, then:

if the unqueued message requires that the queue be cleared before processing the unqueued message, receiving and processing the next queued message; otherwise receiving and processing the unqueued message, wherein the synchronizer also synchronizes data records on other synchronization clients with data records in corresponding reference datasets, and wherein the synchronizer works with multiple instances of each of the listener, the smart queue loader and the smart queue unloader to synchronize with multiple synchronization clients.

9. A synchronizer for synchronizing data records on a synchronization client with data records in a reference dataset wherein the synchronization client sends messages to the synchronizer during a synchronization process, the synchronizer comprising:

an input queue for initially queuing messages received from the synchronization client;

a smart queue for queuing messages that are determined to be queueable;

a smart queue loader for retrieving a message from the input queue and, if the message is queueable, placing the message on the smart queue and proceeding to retrieve another message from the input queue, or, if the message is not queueable, making the message available for immediate processing as an unqueued messaged and waiting until the message is processed before proceeding to retrieve another message from the input queue;

a synchronization engine for receiving messages one at a time from either the smart queue or directly from the smart queue loader, processing the synchronization messages, and making any required changes to the reference dataset, wherein the synchronization engine receives messages from the smart queue or the smart queue loader according to the following rules:

if there is at least one queued message and there is no unqueued message, receiving and processing the next queued message;

if there is an unqueued message and there is no queued message, receiving and processing the unqueued message;

if there is at least one queued message and there is an unqueued message, then:

if the unqueued message requires that the queue be cleared before processing the unqueued message, receiving and processing the next queued message; otherwise receiving and processing the unqueued message;

an output queue for queuing messages from the synchronizer server to the synchronizer client; and a writer for receiving messages from the output queue, and for placing the messages onto a communications channel between the synchronization client and the synchronizer.

10. A synchronizer for synchronizing data records on a synchronization client with data records in a reference dataset wherein the synchronization client sends messages to the synchronizer during a synchronization process, the synchronizer comprising:

an input queue for initially queuing messages received from the synchronization client;

a smart queue for queuing messages that are determined to be queueable;

a smart queue loader for retrieving a message from the input queue and, if the message is queueable, placing the message on the smart queue and proceeding to retrieve another message from the input queue, or, if the message is not queueable, making the message available for immediate processing as an unqueued messaged and waiting until the message is processed before proceeding to retrieve another message from the input queue; and a synchronization engine for receiving messages one at a time from either the smart queue or directly from the smart queue loader, processing the synchronization messages, and making any required changes to the reference dataset, wherein the synchronization engine receives messages from the smart queue or the smart queue loader according to the following rules:

if there is at least one queued message and there is no unqueued message, receiving and processing the next queued message;

if there is an unqueued message and there is no queued message, receiving and processing the unqueued message;

if there is at least one queued message and there is an unqueued message, then:

if the unqueued message requires that the queue be cleared before processing the unqueued message, receiving and processing the next queued message; otherwise receiving and processing the unqueued message, wherein the smart queue may be disabled, and, when the smart queue is disabled, all messages are passed directly from the smart queue loader to the synchronization engine.

* * * * *